United States Patent [19]
Saha

[11] Patent Number: 6,130,929
[45] Date of Patent: Oct. 10, 2000

[54] METHOD FOR ELIMINATING ARTIFACTS IN SCANNING ELECTRON BEAM COMPUTED TOMOGRAPHIC IMAGES DUE TO CONE BEAM GEOMETRY

[75] Inventor: Partha Saha, San Jose, Calif.

[73] Assignee: Imatron, Inc., South San Francisco, Calif.

[21] Appl. No.: 09/209,675

[22] Filed: Dec. 11, 1998

[51] Int. Cl.$^7$ ........................................................ A61B 6/03
[52] U.S. Cl. .................................. 378/4; 378/10; 378/15; 378/901
[58] Field of Search .............................. 378/4, 8, 10, 15, 378/62, 901; 382/131

[56] References Cited

U.S. PATENT DOCUMENTS 5,491,734  2/1996  Boyd et al. ................................. 378/10

OTHER PUBLICATIONS

Feldkamp, L.A., et al., "Pratical Cone Beam Algorithm", Journal of Optical Soc. Am., vol. A6, pp. 612–619, 1984.
Schaller, S., "3D Fourier Image Reconstruction", Erlanger (1994) (doctoral dissertation, translated from German).
Schaller, S.,et al., "New, efficient Fourier–reconstruction method for approximate image reconstruction in spiral cone–beam CT at small cone angles".

Primary Examiner—David V. Bruce
Attorney, Agent, or Firm—Flehr Hohbach Test Albritton & Herbert LLP

[57] ABSTRACT

Computed tomographic ("CT") x-ray scanning yields a discrete set of measurement values that are line integrals of attenuation coefficients $\mu(r)$, which attenuation coefficients may be obtained using suitable reconstruction techniques. Electronic beam computed tomograph ("EBCT") systems add error to the reconstructed attenuation coefficients owing to their unique cone geometry. A method is provided that reduces such errors. At least two scans, "tilted" by the system cone angle, collect data in the neighborhood of a reference plane normal to the system z-axis. These scans are rebinned into parallel projections, and a series expansion is considered for variation of $\mu(r)$ in the vicinity of the reference plane. If a first order series is considered sufficient, then two scans are required to estimate the slope A of the variation in data. The data can then be corrected for the "tilt" and line integrals on the reference plane normal to the z-axis obtained. If a second order series is necessary, two parameters A and B need to be determined from three suitably spaced scans, and the data corrected to obtain line integrals on the reference plane. The data can be corrected in the spatial domain by integration or preferably in the transform domain by differentiation. Once the line integrals are obtained on the reference plane, standard two-dimensional CT reconstruction be carried out to obtain the correct attenuation coefficients. The result is to provide a reconstructed image with reduced cone beam error.

20 Claims, 4 Drawing Sheets

METHOD FOR ELIMINATING ARTIFACTS IN SCANNING ELECTRON BEAM COMPUTED TOMOGRAPHIC IMAGES DUE TO CONE BEAM GEOMETRY

FIELD OF THE INVENTION

Computed tomographic ("CT") image reconstruction theory assumes that the source of X-ray and ring of X-ray detectors lie in the same plane during the entire data acquisition stage. However this coplanar assumption is violated by scanning electron beam computed tomography ("EBCT") systems as a small longitudinal offset is introduced between the path of the X-ray source and the plane of the detectors. The present invention relates generally to improving images produced by EBCT X-ray systems, and more particularly to eliminating artifacts in the images resulting from the unique "cone beam" geometry of these systems.

BACKGROUND OF THE INVENTION

Early in this century, the Austrian mathematician J. Radon demonstrated that a planar two-dimensional slice of a three-dimensional object could be reproduced from a correctly chosen set of projections in the selected plane. CT X-ray systems generate a planar set of X-ray beam projections through an object to be examined. The resultant detected X-ray data are computer processed to reconstruct a tomographic image-slice of the object.

CT systems subject the object under examination to pencil-like X-ray beams from many different directions. In a "fan beam" system, the X-rays radiate from a point-like source and data are collected at the end points of a fan at any given moment to form a "view". By contrast, in a "parallel beam" system, a "view" is made by a number of X-rays all parallel to each other. In either system, a view is one projection of the object onto the detectors, and a scan is a collection of views with a view angle that changes from one view to the next in a systematic manner.

In a fan beam scanning electron beam system such as described in U.S. Pat. No. 4,521,900 to Rand, or U.S. Pat. No. 4,352,021 to Boyd, an electron beam is produced by an electron gun and accelerated downstream along the z-axis of an evacuated chamber. Further downstream, a "beam optical" system deflects the electron beam and brings it to a focus on a suitable target, typically a large arc of tungsten material. The electron beam, on impact with the target, gives rise to a fan of X-rays.

The emitted X-rays penetrate an object (e.g., a patient) disposed along the z-axis (typically on a couch) and lying within a so-called reconstruction circle. X-ray beams passing through the object are attenuated by various amounts depending upon the nature of the traversed object (e.g. bone, tissue, metal). A group of X-ray detectors, disposed on the far side of the object, receive the attenuated beams and provide signals proportional to the strength of these beams.

Typically the output data from the detectors are processed using a filtered back-projection algorithm. Detector data representing the object scanned from many directions are arranged to produce attenuation profiles for each direction. The attenuation profiles are then back-projected and superimposed to produce a computed tomographic image of the original object. Algorithms for such reconstruction are described in the literature, e.g. in "Principles of Computerized Tomographic Imaging" by Avinash Kak and Malcolm Slaney, IEEE Press, N.Y. (1987). The reconstructed image may then be displayed on a video monitor. As noted, the geometry of EBCT scanners produces undesired artifacts that are visible in the reconstructed displayed image.

Systems similar to what is described in the above patents to Rand or Boyd are manufactured by Imatron, Inc., located in South San Francisco, Calif. These systems are termed "short scan" because the views used for reconstructing the object image cover 180° plus the fan beam angle (about 30°), e.g., about 210°, rather than a full 360°.

As seen in FIGS. 1A and 1B, the source of X-rays in these systems traverses a circular path $14'$ that is shifted longitudinally (along the z-axis) from a circle $22'$ upon which detectors in a detector array 22 are disposed. The source of the X-rays thus travels within a second plane, also orthogonal to the z-axis, but not necessarily coincident with the first plane on which the detectors lie. The offset between the planes, $\Delta z$, is in the order of a cm or so. Thus, while ideally reconstruction creates an image in a plane perpendicular to the z-axis using views acquired in that plane, reconstruction of images in these systems have to use views that are not perpendicular to the z-axis.

This $\Delta z$ offset causes the X-ray beam to sweep out a shallow cone during the scan. Unless this "cone beam" geometry is accounted for in the reconstruction of the image, image artifacts result. In objects that vary in attenuation along the z-axis, artifacts show as streaks in reconstruction.

U.S. Pat. No. 5,406,479 to Harman (1995) discloses a method that can take the fan beam data from these systems, use "rebinning" to form the corresponding parallel beam data, and finally apply "transform domain" algorithins that can then rapidly reconstruct the image on conventional computer array processors. This is to be contrasted with customized backprojection equipment, that makes CT systems costly and upgrades of systems time consuming. Moreover, before the Harman invention, CT system manufacturers had to rely on sole-source equipment such as backprojectors.

In the method disclosed in the Harman patent, the so-called "cone geometry problem" in image reconstruction is solved using a heuristic approach. The approach seems to work well, especially for shallow cone angle EBCT scanner systems. However it is difficult to analyze the accuracy of the Harman method, and it is difficult to extend the method, for example to the use of more than two scans, or for larger cone angles. Applicant refers to and incorporates herein by reference U.S. Pat. No. 5,406,479 to Harman for additional material set forth therein.

What is needed is an "analyzable" method for understanding and solving the "cone geometry problem" in image reconstruction of EBCT systems. Preferably, when compared to existing (heuristic) methods, such a method should function more rapidly, and improve signal/noise characteristics of the final reconstructed image in situations where the existing methods have been shown to be successful. In addition, such a method should allow easy extension to hitherto difficult settings where more than two scans or larger cone angles are involved.

The present invention provides such a method.

SUMMARY OF THE INVENTION

The present invention compensates for cone beam error in a CT system using a corrective method that infers line integrals within a fixed two-dimensional plane, by using known line integrals lying at a shallow angle, the cone angle, to that plane.

The vector r will be used to denote three dimensional position. In X-ray scanning an object, computed tomography seeks to reconstruct a function $\mu(r)$, that represents the attenuation coefficient of the object at position r.

The geometry for non-cone beam tomographic x-ray scanners will be first described, then the modifications necessary for cone beam geometry will be indicated.

A typical non-cone beam tomographic scanner collects X-ray data along straight paths within a plane (the scan plane) that is assumed to be perpendicular to the system z-axis. The X-ray data is a set of discrete measurements, and each measurement value is converted using a calibration procedure into an estimate of a line integral along a straight path through the object. The line integrals may be collected in fan beam geometry. However, for purposes of the present invention, it will be assumed that the line integrals have been rebinned into parallel beam geometry, using techniques such as those disclosed in the Harman patent. In parallel beam geometry, line integral data is organized into a set of projections. Each projection (or view) consists of those line integrals within the scan plane (x-y plane) that form a common angle (denoted projection angle $\psi_l$) with the x-axis. Stated differently, a projection or view consists of integrals along a set of parallel lines. To properly reconstruct an image from the data, the projection data must be collected for projection angles covering a range of at least 180°.

In a cone beam tomographic scanner, with which the present invention may advantageously be used, the line integrals do not follow paths lying on a plane normal to the z-axis. In a parallel view, each path makes a non-zero angle with the (z=0) plane—if all the paths in a parallel view made the same angle, then an angle called the "cone angle", denoted by $\phi$, for that view can be defined. In this case, the paths in a parallel view all occupy a plane inclined at an angle of $\phi$ with respect to the vertical. If the distance of the plane from the origin is denoted by $u_i$, then the plane for each parallel view is positioned in three dimensional space by the parameters $\psi_l$, $\phi$, and $u_i$. Associated with $u_i$ is the z-axis distance, $z_i = u_i / \cos(\phi)$.

An orthogonal system $(n_1, n_2, n)$ for each view can be set up, where $n_1$ and $n_2$ are contained within the plane of the view and n is perpendicular to the plane. Unit vectors $n_1$ and $n_2$ are chosen such that $n_2$ is parallel to the paths within the view. Each path can be denoted by $p_k$, the distance of the path from the origin of the $n_1$, $n_2$ plane. Each path $p_k$ collects data along the line given by $(p_k n_1 + \lambda n_2 + z_i e_z)$ where $-\infty < \lambda < \infty$.

Scanning an object yields the discrete set of measurement values $$f_{ikl} = \int \mu(r = p_k n_1 + \lambda n_2 + z_i e_z) d\lambda, \qquad (1)$$

where index i refers to a particular position of the couch on which the object rests, each index l refers to a particular projection at angle $\psi_l$, and each index k refers to a particular path at a distance $p_k$ within that projection.

The present invention infers a projection lying in a plane normal to the z-axis from data from two or more inclined projections with different couch positions, $Z_i$. The function $\mu(r)$ in equation (1) is represented as a sum of terms, the first of which is the value of the function on the plane chosen normal to z-axis. The other terms are given by a series expansion which, when corresponding projections at different couch positions are considered, can be estimated and subtracted out. Once a full set of "inferred" projections is obtained for the chosen plane, image reconstruction can proceed as in a non-cone beam scanner using standard CT reconstruction algorithms.

Other features and advantages of the invention will appear from the following description in which the preferred embodiments have been set forth in detail in conjunction with the accompanying drawings.

DESCRIPTION OF THE PREFERRED EMBODIMENTS

Figure 1B:
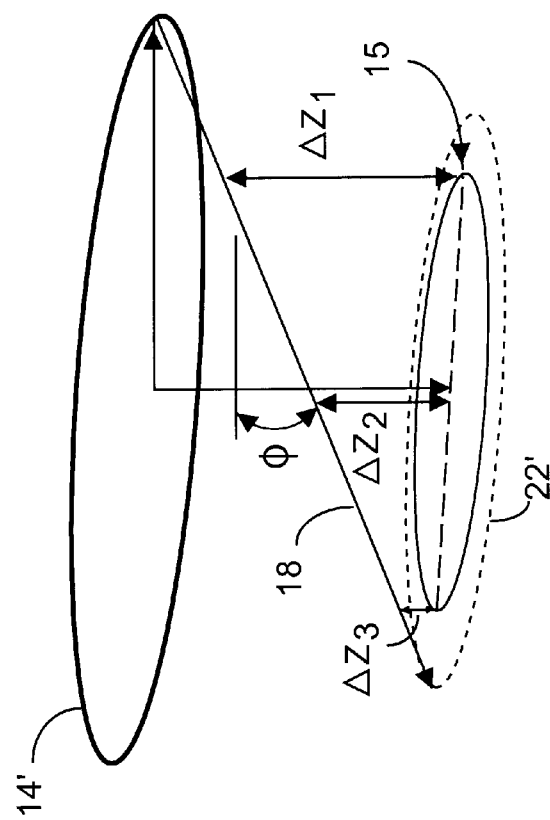
FIG. 1B depicts the longitudinal offset between the X-ray source path and the detector ring which gives rise to the cone geometry in EBCT X-ray scanners.
Figure 1A:
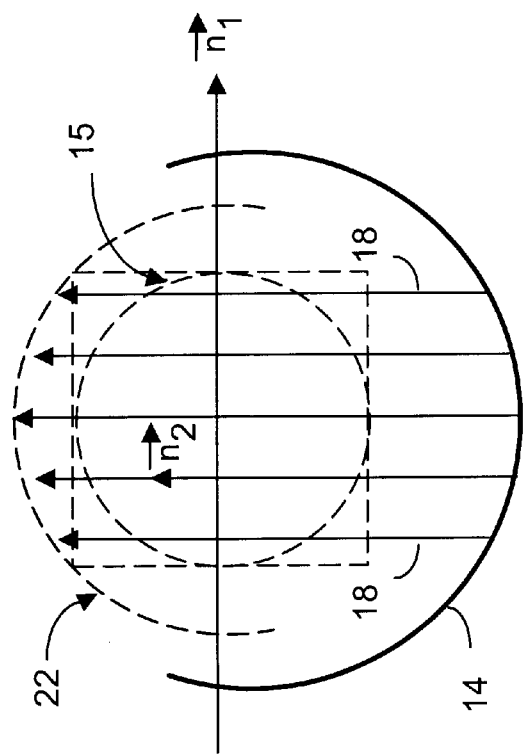
FIG. 1A depicts a parallel projection (view) obtained from a scanning electron beam computed tomography (EBCT) X-ray systems.
Figure 2A:
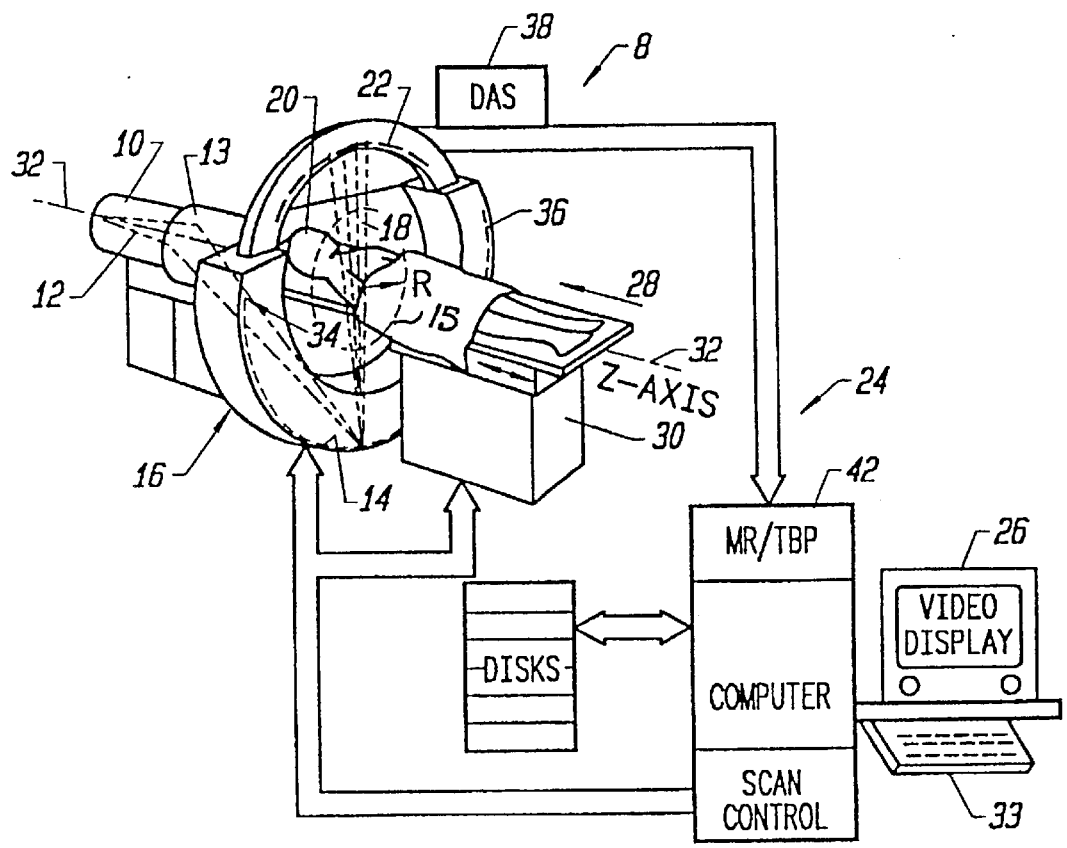
FIG. 2A depicts a fan beam scanning electron beam computed tomography system for which the present invention may be practical.

FIG. 2A depicts a scanning electron beam computed tomography ("CT") system 8 with which the present invention may be practiced. System 8 includes a vacuum housing chamber 10 wherein an electron bean 12 is generated and caused by a beam optics assembly 13 to scan a circular target 14 located within chamber 12's front lower portion 16. Upon being struck by the electron beam, the target—which typically scans 210° or so—emits a fan-like beam of X-rays 18 that pass through a region of a subject 20 (e.g., a patient or other object) lying within a reconstruction circle 15 having radius R. These rays then register upon a region of a detector array 22 located generally diametrically opposite.

The detector array outputs data to a computer processing system 24 that processes and records the data; the final image is displayed on a video monitor 26. A data acquisition system ("DAS") 38 provides signal processing for the computer system 24, including digitization of the analog output from the various detectors. The computer system 24 also controls the movement along the z-axis 32 of patient 20 who lies on a couch system 30.

Figure 2B:
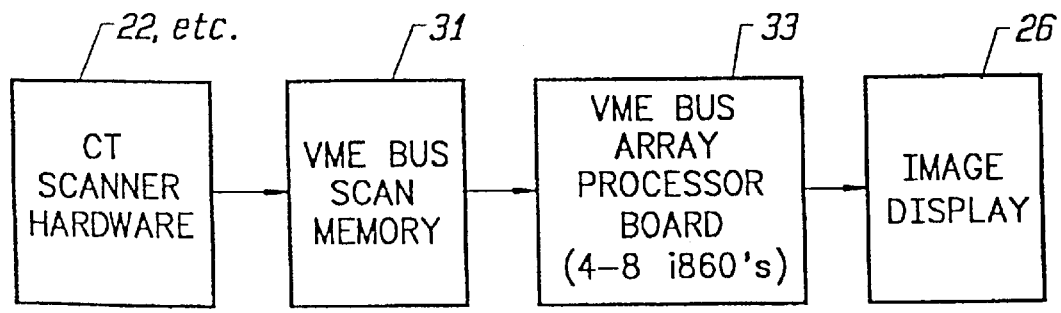
FIG. 2B is a block diagram of an exemplary hardware system with which the present invention may be practiced.

FIG. 2B shows a in more detail the portions 24 and 42 of FIG. 2A, as implemented by the EBCT scanner manufactured by Imatron, inc. The MR/TBP section of 42 in FIG. 2A refers to a computer program that accomplishes "Modified Rebinning" and "Transform Back Projection" as described in U.S. Pat. No. 5,406,479 to Harman, and would be located in one or more i860 array processors 33 (manufactured by Mercury Computer Systems, located in Lowell, Mass.) as shown in FIG. 2B. Of course other post-acquisition procedures could instead be used. The steps carried out by the computer program are used to form the final image displayed on the video monitor 26. It is in this program that the present invention is advantageously used.

Figure 3B:
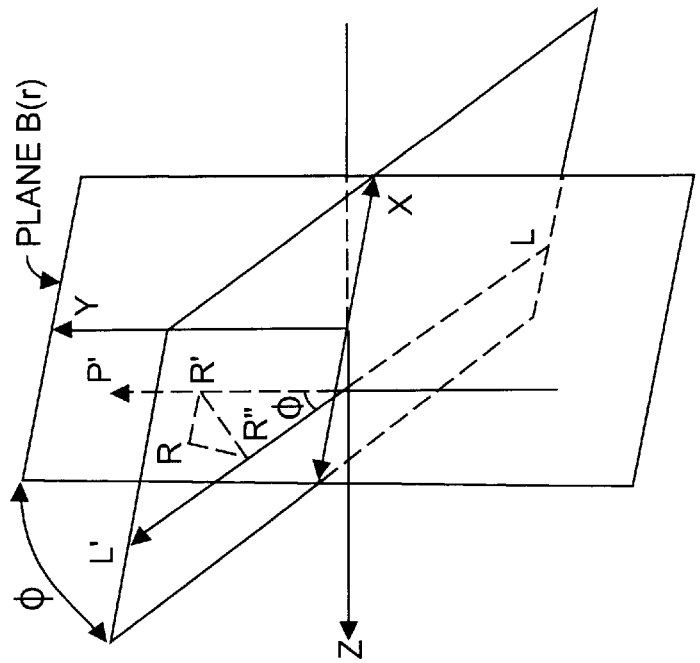
FIG. 3B depicts the assumption used by Schaller to correct images for errors from cone geometry.
Figure 3A:
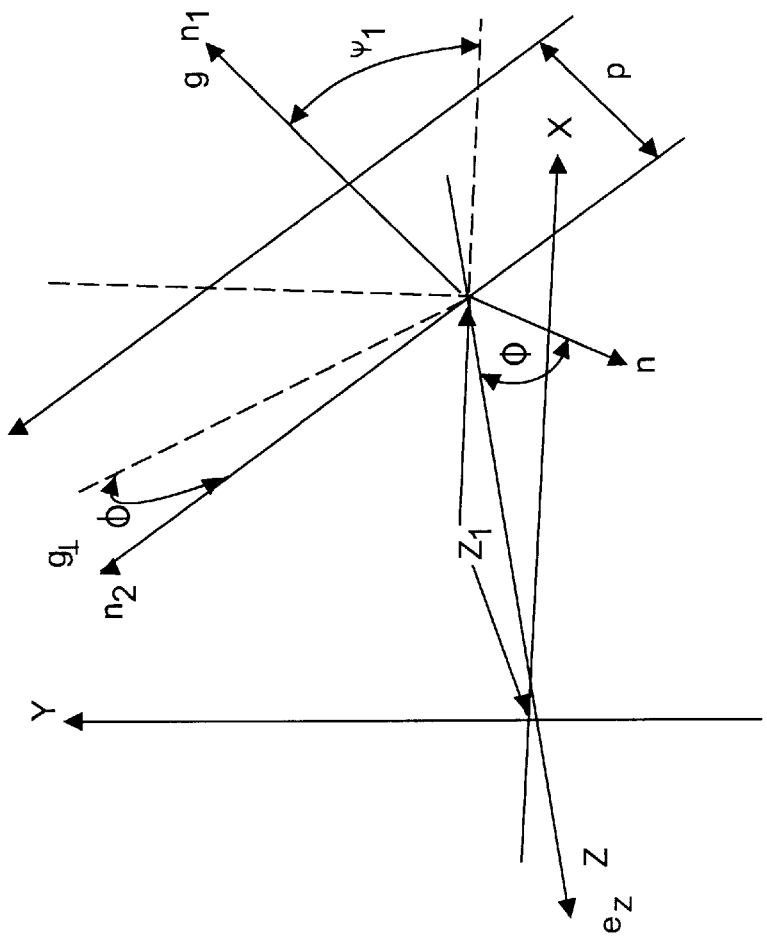
FIG. 3A depicts a parallel projection with a cone angle and depicts the nomenclature used to describe the present invention herein.

Applicant refers to and incorporates herein by reference said patent to Harman for its description of an exemplary computer program used to convert the acquired data into a final image. To understand how such computer program and its supporting theory may be modified to incorporate the present invention, nomenclature depicted in FIG. 3A will now be used. FIG. 3A shows a parallel projection with cone angle φ that can be obtained as explained in the Harman patent.

As shown in FIG. 3A, an orthogonal system $(n_1, n_2, n)$ for each view can be set up where $n_1$ and $n_2$ are contained within the plane of the view and n is perpendicular to the plane. The unit vectors $n_1$ and $n_2$ are chosen so that $n_2$ is parallel to the paths within the view. Each path can be denoted by $p_k$, the distance of the path from the origin of the $n_1$, $n_2$ plane. Then each path $p_k$ collects data along the line given by $(p_k n_1 + \lambda n_2 + z_i e_z)$ where $-\infty < \lambda < \infty$.

Scanning an object yields the discrete set of measurement values $$f_{ikl} = \int \mu(r = p_k n_1 + \lambda n_2 + z_i e_z) d\lambda, \quad (2)$$

where index i refers to a particular position of the couch on which the object rests, each index l refers to a particular projection at angle $\psi_l$, and each index k refers to a particular path at a distance $p_k$ within that projection.

In *3D Fourier Image Reconstruction* (Erlangen 1994), S. Schaller demonstrates that a three dimensional object $B(r)$ may be reconstructed from $f_{ikl}$ according to equation (2) as follows, $$B(r) = \sum_{ikl} G\left(\min_\lambda |r - z_i e_z - p_k n_1 - \lambda n_2|\right) f_{ikl}, \quad (3)$$

where the function G takes as argument the distance of the point r from the line represented by $f_{ikl}$ as given in equation (2). If the following approximation can be made, $$G\left(\min_\lambda |r - z_i e_z - p_k n_1 - \lambda n_2|\right) \approx L(r \cdot n_1 - p_k) h(r \cdot n - u_i), \quad (4)$$

Schaller notes how reconstruction computations are simplified and can be be used for "cone beam" data. Let the vector r be chosen to define the plane shown in FIG. 3B perpendicular to the z-axis. If a point R is chosen on this plane, then approximation (4) implies $$G(RR'') \approx L(RR') h(R'R''). \quad (5)$$

Now since RR' lies on a plane, L is chosen to be the conventional two dimensional reconstruction kernel, while h, taking R'R" as its argument, can be chosen to be an interpolation function. The heuristic approach explained in the Harman patent for correcting cone geometry artifacts in images adopts a stratagem somewhat similar to the Schaller approximation (4) described above. Heuristic approaches such as the one by Schaller and in the Harman patent, use approximations that do not closely follow the theory of reconstruction, and therefore, are hard to analyze. This motivates the present invention.

The present invention approaches the cone geometry problem differently. Referring again to FIG. 3B, if one could infer the line integral PP' from the line integrals LL' on the selected plane, one could then apply conventional two-dimensional computed tomographic reconstruction techniques without any additional assumptions. Inferring the line integral PP' implies inferring the points on it from the knowledge of neighboring points on line integrals LL'. To the extent an unknown point can be inferred from the knowledge about neighboring points, the reconstructed image would also be correct.

Referring back to equation (2), consider all the $f_{ikl}$ given by this equation for one particular $u_i$. For all the rays given by these f, consider one reference plane perpendicular to the z-axis as shown in FIG. 3B. For each projection angle $\psi_l$, one can consider the actual projection plane tilted out of the x-y plane due to the cone angle φ, and another reference plane on the x-y plane.

Consider a representation of vectors $(n_1, n_2)$ on the projection plane in terms of vectors $(e_1, e_2, e_3)$ on the reference plane. It will be appreciated that vectors $e_1$, $e_2$ are vectors $e_x$, $e_y$ turned through projection angle $\psi_l$, respectively. Vector $e_3$ is vector $e_z$ shifted by $z_i$ from the origin. Equation (6) summarizes these relationships:

$$n_1 = e_1, n_2 = (\cos \phi) e_2 + (\sin \phi) e_3, e_3 = e_z. \quad (6)$$

Equation (7) follows from putting equation (6) in equation (2):

$$f_{ikl} = \int \mu(r = p_k e_1 + \lambda(\cos \phi) e_2 + \lambda(\sin \phi) e_3) d\lambda. \quad (7)$$

A first assumption that is made is to assume validity of a series expansion for variation of $\mu$ in the $e_3$ direction:

$$\mu(r = p_k e_1 + \lambda e_2 + \delta z_i e_3) = \mu(r = p_k e_1 + \lambda e_2 + 0 e_3) + A(r = p_k e_1 + \lambda e_2 + 0 e_3) \cdot \delta z_i + B(r = p_k e_1 + \lambda e_2 + 0 e_3) \cdot (\delta z_i)^2 + \quad (8)$$

Figure 3D:
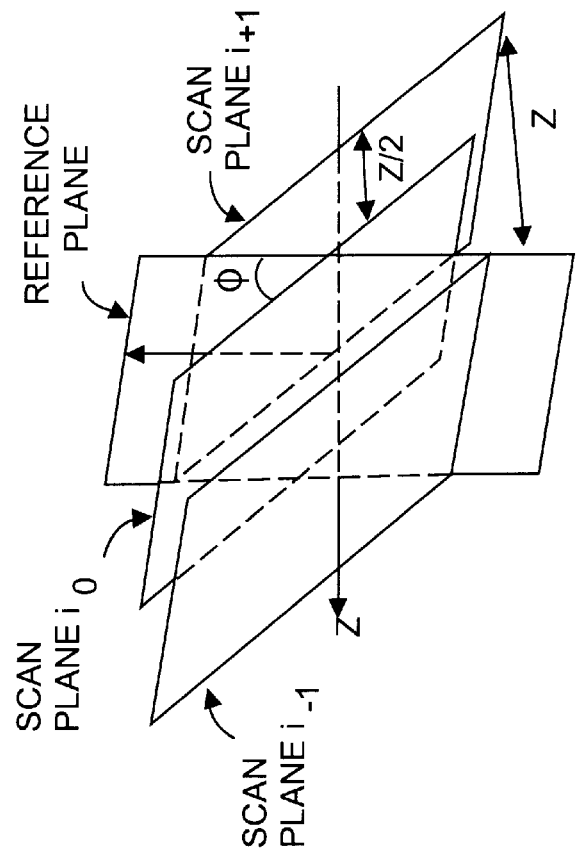
FIG. 3D depicts the positioning of the reference scan plane in a model for cone beam error correction that uses three consecutive scans and a second order series expansion, according to the present invention.
Figure 3C:
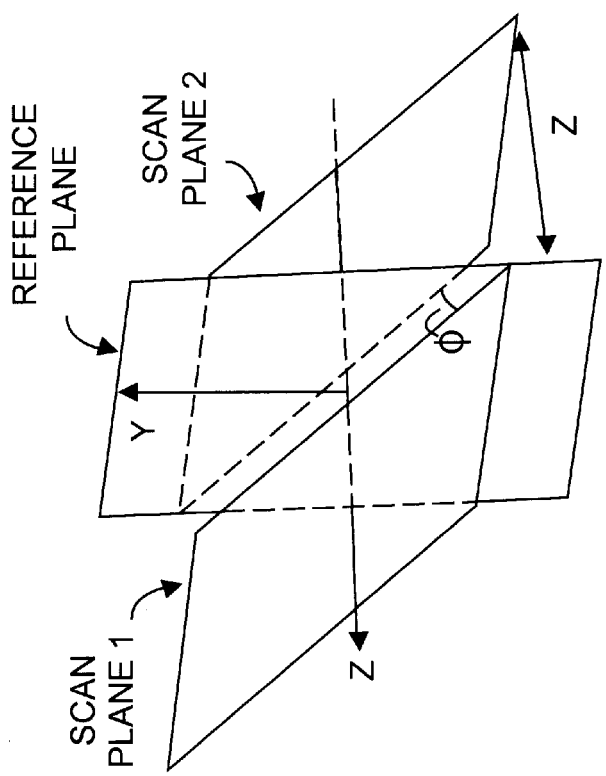
FIG. 3C depicts the positioning of the reference scan plane in a model for cone beam error correction that uses two consecutive scans and a first order series expansion, according to the present invention.

A decision is made about the order of series expansion that is adequate to infer the line integrals on the plane perpendicular to z-axis. For this, a distance, the "cone distance", shown as Z in FIGS. 3C and 3D, needs to be defined. Z is twice the distance between the end point (given by the edge of the reconstruction circle) of a ray and the reference plane as shown as shown in FIG. 3B. To interpolate a point within the reconstruction circle on the reference plane as shown in FIGS. 3C and 3D, tilted ("cone beam") scans that cover a longitudinal distance of at least Z in front, and a distance Z behind the reference plane are needed. The number of scans is given by the nature of the object being imaged and the longitudinal averaging with which the raw data is acquired.

If the attenuation data varies longitudinally at most linearly over 2Z, two scans as shown in FIG. 3C and a first order series are adequate. If, instead, the attenuation data is expected to vary at most quadratically over this extent, three scans as shown in FIG. 3D and a second order series will be found adequate. In this way, the proper number of scans and the order of the series may be determined.

The processing that is required for the first (two scans) and second (three scans) order series will now be described. Applicant believes that generalization of these methods to higher orders can be carried out in the manner shown without substantial difficulty.

In the case a first order expansion is found adequate, the series expansion obtained from equation (7) and with the definition of $\lambda' \equiv \lambda \cos \phi$, is $$(\cos \phi) f_{ikl} = \int \mu(r = p_k e_1 + \lambda' e_2 + 0 e_3) d\lambda' + (\tan \phi) \int \lambda' A(r = p_k e_1 + \lambda' e_2 + 0 e_3) d\lambda'. \quad (9)$$

The conversion of λ to λ' is necessary because line elements differ from a tilted plane to a plane perpendicular to the z-axis. Next, by transposition of the different parts to the above equation, the following is obtained:

$$\int \mu(r = p_k e_1 + \lambda' e_2 + 0 e_3) d\lambda' = (\cos \phi) f_{ikl} - (\tan \phi) \int \lambda' A(r = p_k e_1 + \lambda' e_2 + 0 e_3) d\lambda'. \quad (10)$$

Equation (10) shows how the line integral on the reference plane (left hand side) can be obtained from the measured $f_{ikl}$ if A can be determined. It will now be shown that A can indeed be obtained from two scans as shown in FIG. 3C.

Two scans at couch positions $u_i$ and $u_{i'}$ are taken as shown in FIG. 3C with the scanner system. This implies that all values $f_{ikl}$ and $f_{i'kl}$ are obtained with a longitudinal distance Z, the cone distance, apart. Thus $u_{i'} = u_i + (Z/\cos\phi)$. If now a reference plane as shown in FIG. 3C is selected, located Z/2 between the first and second scan planes, equation (9) for the two scans can be written as follow:

$$(\cos\phi) f_{ikl} = \int \mu(r = p_k e_1 + \lambda' e_2 + 0 e_3) d\lambda' + \quad (11)$$
$$(\tan\phi) \int \left(\lambda' + \frac{Z}{2}\right) A(r = p_k e_1 + \lambda' e_2 + 0 e_3) d\lambda',$$

$$(\cos\phi) f_{i'kl} = \int \mu(r = p_k e_1 + \lambda' e_2 + 0 e_3) d\lambda' + \quad (12)$$
$$(\tan\phi) \int \left(\lambda' - \frac{Z}{2}\right) A(r = p_k e_1 + \lambda' e_2 + 0 e_3) d\lambda'.$$

Subtracting equation (12) from (11), the line integrals for A are obtained:

$$(\cos\phi)(f_{ikl} - f_{i'kl}) = Z \int A(r = p_k e_1 + \lambda' e_2 + 0 e_3) d\lambda'. \quad (13)$$

In this way A can be determined. Referring to equation (10), it will be noticed that $\int \lambda' A$ needs to be evaluated from A. This evaluation can be either done in the spatial domain by actual integration, or in the transform domain. Let the two-dimensional Fourier Transform plane for the spatial coordinates $(p_k, \lambda')$ of the projection plane be given by $(k^p, k^\lambda)$. The Discrete Fourier Transform of all $\int A(r = p_k e_1 + \lambda' e_2 + 0 e_3) d\lambda'$ for various values of $p_k$ in a parallel view, by the Fourier Slice Theorem, is given by $A(k_i^P, k^\lambda = 0, \psi_l)$. where $\psi_l$ is the corresponding view angle and $k_i^P$ are discrete frequencies on the $k^P$ axis given by the discrete samples $p_k$ in the spatial domain. The Discrete Fourier Transform of all $\int \lambda' A(r=p_k e_1 + \lambda' e_2 + 0 e_3) d\lambda'$, similarly, is given by $(j/2\pi) \times [(d/dk^\lambda) A(k_i^P, k^\lambda, \psi_l)]\uparrow_{k^\lambda=0}$. Thus, the correction of each view can also be done in the transform domain by a suitable approximation of differentiation with the available views.

As stated earlier, if the attenuation data are assumed to vary at most quadratically over the distance 2Z, a second order series may be assumed. To obtain the line integrals on the reference plane, the following equation, derived from equations (8) and (9), is used:

$$\int \mu(r=p_k e_1 + \lambda' e_2 + 0 e_3) d\lambda' = (\cos\phi) f_{ikl} - (\tan\phi) \int \lambda' A(r=p_k e_1 + \lambda' e_2 + 0 e_3) d\lambda' - (\tan\phi)^2 \int (\lambda')^2 B(r=p_k e_1 + \lambda' e_2 + 0 e_3) d\lambda'. \quad (14)$$

If the second order series is required for correction, three scans as shown in FIG. 3D—indicated by $i_{-1}$, $i_D$, and $i_{+1}$—are obtained. Indexing each scan by $i_m$, the equation (14) for each scan can be written, $$\int \mu(r = p_k e_1 + \lambda' e_2 + 0 e_3) d\lambda' = \quad (15)$$
$$(\cos\phi) f_{i_m kl} - \int \left(\lambda' \tan\phi - m\frac{Z}{2}\right) A(r = p_k e_1 + \lambda' e_2 + 0 e_3) d\lambda' -$$
$$\int \left(\lambda' \tan\phi - m\frac{Z}{2}\right)^2 B(r = p_k e_1 + \lambda' e_2 + 0 e_3) d\lambda'.$$

The above equations can be manipulated to obtain:

$$(\cos\phi)\cdot(f_{-1kl} - f_{+1kl}) = Z\int A(r = p_k e_1 + \lambda' e_2 + 0 e_3) d\lambda' + \quad (16)$$
$$2Z\tan(\phi)\int \lambda' B(r = p_k e_1 + \lambda' e_2 + 0 e_3) d\lambda',$$

$$(\cos\phi)\cdot\left(\frac{f_{-1kl} + f_{+1kl}}{2} - f_{0kl}\right) = \quad (17)$$
$$(Z^2/4)\cdot\int B(r = p_k e_1 + \lambda' e_2 + 0 e_3) d\lambda'.$$

Equation (17) can be used to obtain line integrals for B. Next, $\int \lambda' B$ can be obtained in the spatial or transform domain by techniques discussed above with respect to two scan first order correction. Once $\int \lambda' B$ is available, equation (16) can be used to obtain the line integrals for A.

Finally, equation (14) can be used to obtain the line integrals on the reference plane. The integrals $\int (\lambda')^2 B$ need to be obtained and this can be done in the spatial domain or in the transform domain. By application of the Fourier Slice Theorem, it can be shown that the Fourier Transform of the required integrals are given by $(j/2\pi)^2 \times [(d^2/(dk^\lambda)^2) B(k_i^P, k^\lambda, \psi_l)]\uparrow_{k^\lambda=0}$. Thus, once again, suitable approximation of differentiation with the available views is needed in the transform domain.

The derivatives that are needed for correction in the transform domain are required with respect to the orthogonal cartesian axis; however, the scanned data, by the Fourier Slice Theorem, are obtained equally spaced in a radial manner after the transform. To allow an estimation of the derivatives by differencing of the neighboring acquired views, the cartesian derivatives can be cast in their polar form:

$$\left[\frac{\partial}{\partial k^\lambda} A(k_i^P, k^\lambda, \psi_l)\right]\bigg|_{k^\lambda = 0} \equiv -\frac{1}{k_i^P}\left[\frac{\partial}{\partial \psi} A(k_i^P, k^\lambda = 0, \psi)\right]\bigg|_{\psi=\psi_l}, \quad (18)$$

$$\left[\frac{\partial^2}{\partial (k^\lambda)^2} b(k_i^P, k^\lambda, \psi_l)\right]\bigg|_{k^\lambda=0} \equiv \frac{1}{(k_i^P)^2}\left[\frac{\partial^2}{\partial \psi^2} B(k_i^P, k^\lambda = 0, \psi)\right]\bigg|_{\psi=\psi_l} + \quad (19)$$
$$\frac{1}{k_i^P}\left[\frac{\partial}{\partial k^P} B(k^P, k^\lambda = 0, \psi_l)\right]\bigg|_{k^P=k_i^P}.$$

Since the correction can be implemented in the transform domain by differencing of neighboring views, there does not need to be a second back projection step as required in the method described in the patent to Harman. Also, equations (18) and (19) show that the radial differences obtained from the acquired views need to be divided by the corresponding radial frequency—the higher the frequency, the higher the divisor. This implies that high frequency noise in the acquired views do not contribute much to the correction, leading to less noise in the corrected image than that obtained if the heuristic correction of Harman is applied.

In the foregoing analysis, it has been assumed that the different scans at each projection angle $\psi_l$ were made by rays that all lay on a single plane. Rays may have different values of $\phi$ while still being parallel to each other. Equations (13), (16), and (17) then need the appropriate angle for each ray. The reference plane remains the same along with the series expansion as described before. Thus, it will be appreciated that the methodology of the present invention is flexible in that it can be further generalized.

As used herein, the expression "at least reduced" means that the cone beam error is reduced if not actually eliminated, by the present invention. It will be appreciated that the present invention may be implemented in software, executable by the computer system associated with a CT scanner system, in software and firmware, or a combination of any of software, firmware, and hardware. If implemented as software and/or firmware, the present invention presents computer code to at least one central processing unit ("CPU") associated with the scanner system computer. Upon execution by the CPU(s), the software causes the steps described herein to be carried out, in addition to or separately from steps conventionally used to reconstruct a scanner image.

The present invention has been described with respect to correcting cone beam error in an EBCT system. However, it will be appreciated that the invention may be practiced with systems other than such X-ray systems, that also acquire projection data and then use such data to reconstruct images. Similarly, the concept of X-ray attenuation coefficients $\mu(r)$ is understood to encompass other types of projection attenuation coefficients as well. Although the presently preferred embodiment infers line integrals within a fixed two-dimensional plane normal to a z-axis of an EBCT system, it will be appreciated that this could more generally apply with necessary re-definitions to an N dimensional system where N was greater than 3.

In the presently preferred embodiment, a priori knowledge about the variation of $\mu(r)$ for the object now under examination with the system will have been obtained previously, preferably from similar objects. Such knowledge may be stored in the memory of the computer 42 (see FIG. 2A) so that a decision can be made by a computer program on the number of scans to acquire. Such knowledge can also be with the user of the computer system 42 who can then instruct the computer to acquire the necessary number of scans.

By way of example, assume that the object under present examination is a portion of the anatomy of a human patient. For certain anatomical regions, the a priori data may predict a substantially linear variation in the acquired $\mu(r)$ data over the cone distance. In such cases, the computer system will then cause the EBCT system to acquire two scans, similar to what is depicted in FIG. 3C. On the other hand, for other anatomical regions under examination, the a priori data may predict a substantially non-linear variation in $\mu(r)$, and the EBCT system will be caused to acquire at least three scans, similar to what is shown in FIG. 3D.

Although not presently implemented, an EBCT system could also be equipped with a dynamic ability to test variation in the acquired $\mu(r)$ data for an object under examination and vary the number of scans (e.g., two for substantially linear variation, more than two if non-linear) on-the-fly.

Modifications and variations may be made to the disclosed embodiments without departing from the subject and spirit of the invention as defined by the following claims.

What is claimed is:

1. A computer-implemented method for correcting cone beam error in an image reconstructed from projection data acquired from a system, the method comprising the following steps:
   (a) using said data to infer line integrals of projection attenuation coefficients $\mu(r)$ within a fixed n-dimensional plane normal to a longitudinal axis of said system, where r is a position vector in n+1 dimensional space;
   (b) for an object presently under examination with said system, employing a priori data of variation in $\mu(r)$ in space over said longitudinal axis to predict whether said variation is substantially linear;
       if said variation is predicted to be substantially linear, using said system to acquire at least a first scan and a second scan spaced-apart from each other along said longitudinal axis a distance at least equal to a cone distance for said system;
       if said variation is predicted to be substantially non-linear, using said system to acquire at least a first scan, a second scan, and a third scan, each of these scans being spaced equidistant from each other such that together said scans encompass at least a distance equal to a cone distance for said system;
   (c) emphasizing a desired representation of $\mu(r)$ by defining actually acquired $\mu(r)$ as a series sum of terms in which a first term is a desired value on said plane, and further including an additional second term if at step (b) said variation was predicted to be substantially linear, and further including at least an additional third term if at step (b) said variation was substantially non-linear;
   (d) using at least some data acquired from said scans at step (b) to estimate variations in $\mu(r)$ resulting from terms other than said first term in said series of expansion; and
   (e) using estimated variations made at step (d) to subtract value from said actually acquired $\mu(r)$ to approximate a desired value of $\mu(r)$ on said plane;
   wherein cone beam error in said image is reduced.

2. The method of claim 1, further including:
   (f) repeating steps (a)–(e) as necessary for sets of projections represented by each scan taken at step (b).

3. The method of claim 1, wherein said system is an x-ray system, and wherein said projection attenuation coefficients $\mu(r)$ are x-ray attenuation coefficients.

4. The method of claim 1, wherein said system includes an electron beam computer tomography X-ray system, and wherein said projection attenuation coefficients $\mu(r)$ are x-ray attenuation coefficients.

5. The method of claim 1, wherein n is two.

6. The method of claim 1, wherein:
   step (b) includes using a priori data having at least one characteristic selected from a group consisting of (i) said data were previously obtained using said system to examine a similar object, (ii) said data were previously obtained using a similar system to examine a similar object, (iii) said data were provided by simulation using said system, and (iv) said data were provided by simulation using a similar system.

7. The method of claim 1, wherein step (b) includes acquiring said first scan and said second scan and determining whether step (e) provides a satisfactory said desired value, and if not satisfactory, causing step (b) to acquire said first scan, said second scan, and said third scan.

8. The method of claim 1, wherein said data used at step (b) have a characteristic selected from a group consisting of (i) said data are acquired as fan beam data, (ii) said data are rebinned into parallel beam geometry from fan beam data, and (iii) said data are acquired as parallel beam geometry data.

9. The method of claim 1, wherein step (e) includes at least one procedure selected from a group consisting of (i) actual integration in a spatial domain, and (ii) approximating actual differentiation in a transform domain.

10. A computer-implemented method for correcting cone beam error in an image reconstructed from projection data acquired by a scanning electron beam computed tomography system, the method comprising the following steps:
   (a) using said data to infer line integrals of x-ray attenuation coefficients $\mu(r)$ within a fixed two-dimensional plane normal to a longitudinal axis of said system, where r is a position vector in three-dimensional space;

(b) for an object presently under examination with said system, employing a priori data of variation in $\mu(r)$ in space over said longitudinal axis to predict whether said variation is substantially linear;

if said variation is predicted to be substantially linear, using said system to acquire at least a first scan and a second scan spaced-apart from each other along said longitudinal axis a distance at least equal to a cone distance for said system;

if said variation is predicted to be substantially non-linear, using said system to acquire at least a first scan, a second scan, and a third scan, each of these scans being spaced equidistant from each other such that together said scans encompass at least a distance equal to a cone distance for said system;

(c) emphasizing a desired representation of $\mu(r)$ by defining actually acquired $\mu(r)$ as a series sum of terms in which a first term is a desired value on said plane, and further including an additional second term if at step (b) said variation was predicted to be substantially linear, and further including at least an additional third term if at step (b) said variation was substantially non-linear;

(d) using at least some data acquired from said scans at step (b) to estimate variations in $\mu(r)$ resulting from terms other than said first term in said series of expansion; and (e) using estimated variations made at step (d) to subtract value from said actually acquired $\mu(r)$ to approximate a desired value of $\mu(r)$ on said plane.

11. The method of claim 10, further including:

(f) repeating steps (a)–(e) as necessary for sets of projections represented by each scan taken at step (b).

12. The method of claim 10, wherein:

step (b) includes using a priori data having at least one characteristic selected from a group consisting of (i) said data were previously obtained using said system to examine a similar object, (ii) said data were previously obtained using a similar system to examine a similar object, (iii) said data were provided by simulation using said system, and (iv) said data were provided by simulation using a similar system.

13. The method of claim 10, wherein step (b) includes acquiring said first scan and said second scan and determining whether step (e) provides a satisfactory said desired value, and if not satisfactory, causing step (b) to acquire said first scan, said second scan, and said third scan.

14. The method of claim 10, wherein said data used at step (b) have a characteristic selected from a group consisting of (i) said data are acquired as fan beam data, (ii) said data are rebinned into parallel beam geometry from fan beam data, and (iii) said data are acquired as parallel beam geometry data.

15. The method of claim 10, wherein step (e) includes at least one procedure selected from a group consisting of (i) actual integration in a spatial domain, and (ii) approximating actual differentiation in a transform domain.

16. A correction system that corrects cone beam error in an image reconstructed from projection data acquired from an acquisition system, the correction system including:

a computer sub-system having a central processor unit and memory, said sub-system programmed to use said data to infer line integrals of projection attenuation coefficients $\mu(r)$ within a fixed n-dimensional plane normal to a longitudinal axis of said system, where r is a position vector in n+1 dimensional space;

said computer sub-system having access to a priori data of variation in $\mu(r)$ in space over said longitudinal axis for an object presently under examination with said system, said sub-system employing said a priori data to predict whether said variation is substantially linear;

if said variation is predicted to be substantially linear, said sub-system causing said acquisition system to acquire at least a first scan and a second scan spaced-apart from each other along said longitudinal axis a distance at least equal to a cone distance for said system;

if said variation is predicted to be substantially non-linear, said sub-system causing said acquisition system to acquire at least a first scan, a second scan, and a third scan, each of these scans being spaced equi-distant from each other such that together said scans encompass at least a distance equal to a cone distance for said system;

said computer sub-system including means for emphasizing a desired representation of $\mu(r)$ by defining actually acquired $\mu(r)$ as a series sum of terms in which a first term is a desired value on said plane, and further including an additional second term if at step (b) said variation was predicted to be substantially linear, and further including at least an additional third term if at step (b) said variation was substantially non-linear;

said computer sub-system programmed to use at least some data acquired from said scans to estimate variations in $\mu(r)$ resulting from terms other than said first term in said series of expansion, and further programmed to use estimated said variations to subtract value from said actually acquired $\mu(r)$ to approximate a desired value of $\mu(r)$ on said plane;

wherein cone beam error in said image is reduced.

17. The correction system of claim 16, wherein said system includes an electron beam computer tomography X-ray system, and wherein said projection attenuation coefficients $\mu(r)$ are x-ray attenuation coefficients.

18. The correction system of claim 16, wherein n is two.

19. The correction system of claim 16, wherein said computer sub-system includes mean for causing said acquisition system to acquire said first scan and said second scan and determining whether two such scans provide a satisfactory said desired value, and if not satisfactory, causing said acquisition system to acquire said first scan, said second scan, and said third scan;

wherein cone beam error in said image is further reduced.

20. The correction system of claim 16, wherein said correction system processes data having a characteristic selected from a group consisting of (i) said data are acquired as fan beam data, (ii) said data are rebinned into parallel beam geometry from fan beam data, and (iii) said data are acquired as parallel beam geometry data.

* * * * *

UNITED STATES PATENT AND TRADEMARK OFFICE
CERTIFICATE OF CORRECTION

PATENT NO.   : 6,130,929
DATED        : October 10, 2000
INVENTOR(S)  : Partha Saha Page 1 of 1

It is certified that error appears in the above-identified patent and that said Letters Patent is hereby corrected as shown below:

Column 3,
Line 56, delete "$Z_l$" and substitute therefor -- $z_1$ --.

Column 7,
Line 42, in equation, delete "]↑" and substitute therefor --]| --.

Column 8,
Line 24, in equation, delete "]↑" and substitute therefor --]| --.

Column 8,
In equation 19, delete "b" and substitute therefor -- B --

Signed and Sealed this

Second Day of October, 2001

*Attest:*

Nicholas P. Godici

NICHOLAS P. GODICI
*Attesting Officer*   *Acting Director of the United States Patent and Trademark Office*